United States Patent Office 3,362,160
Patented Jan. 9, 1968

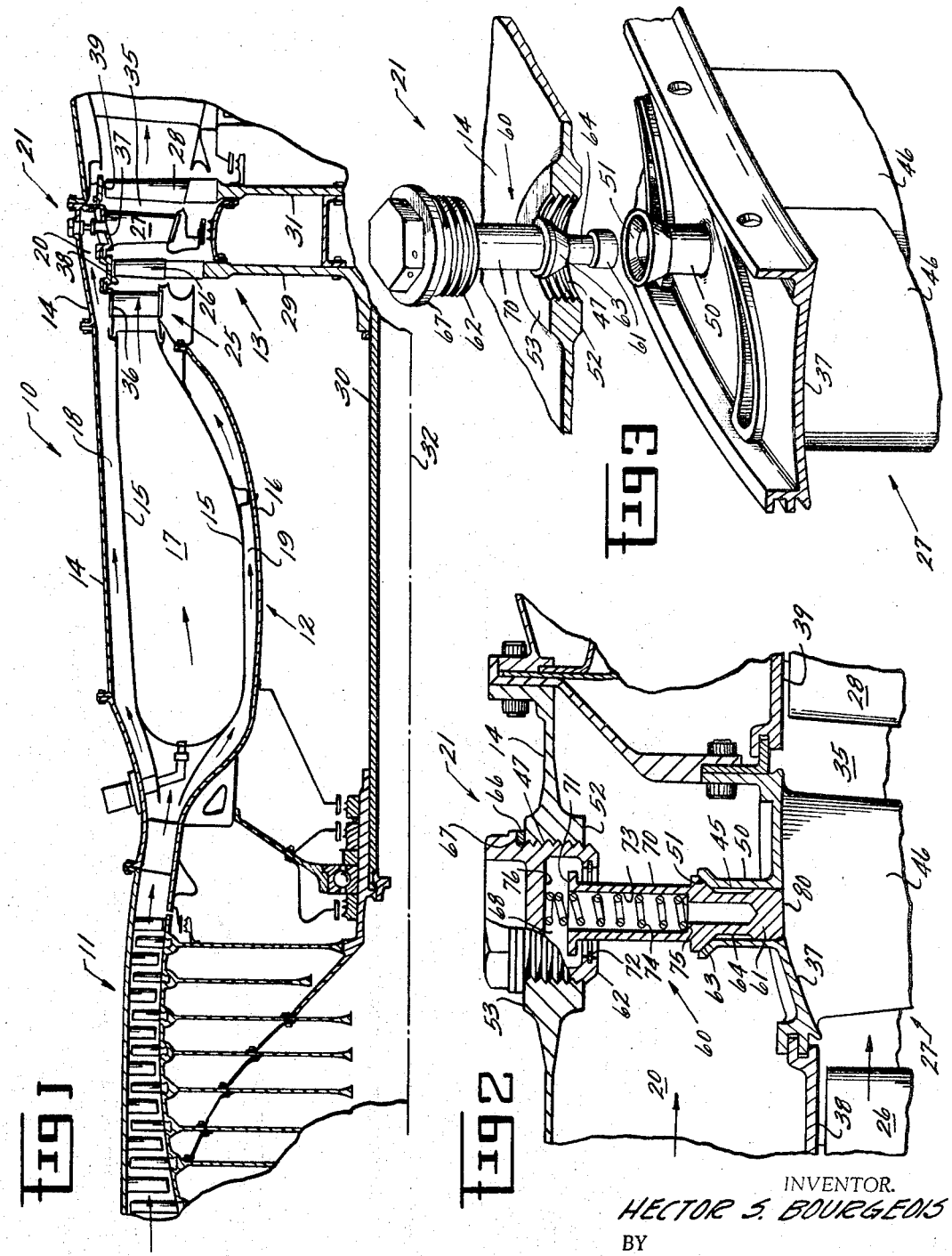

3,362,160
GAS TURBINE ENGINE INSPECTION
APPARATUS
Hector S. Bourgeois, Cincinnati, Ohio, assignor to General Electric Company, a corporation of New York
Filed Sept. 16, 1966, Ser. No. 580,078
10 Claims. (Cl. 60—39.75)

This invention relates to gas turbine engines and, more particularly, to improved inspection apparatus for permitting inspection of high temperature engine components without either disassembling the engine or compromising engine performance.

In modern gas turbine engines, certain components require frequent inspection for possible damage and wear. This is particularly true with respect to those components which operate at elevated temperatures, these high temperature elements including turbine buckets, turbine nozzle vanes, and other components directly exposed to the extremely high temperature products of combustion. While these high temperature elements are designed for the longest practical operating life, the high temperature and corrosive atmosphere within which they operate prevents these elements from attaining high degree of reliability the long life characteristics of engine components operating at lower temperature levels. Accordingly, since deterioration of these elements can adversely affect both engine performance and safety, relatively frequent inspection is required in order to assure safe and satisfactory engine performance.

Inspection of the high temperature engine parts has not been easily accomplished in the past, however, since these parts are buried within the engine in generally inaccessible locations. The usual inspection procedure employed in the past has been to at least partially disassemble the engine, perform the actual inspection and, if necessary, repair or replace any worn or damaged components, and then reassemble the engine. Quite often, inspection reveals that the components are in satisfactory condition with no repair or replacement required. For this reason, it has been long recognized that it would be desirable to provide means for inspecting the high temperature components without disassembling the engine. If this could be accomplished satisfactorily, substantial savings would be realized since it is very expensive with respect to both time and money to disassemble and then reassemble an engine. With this in mind, various inspection arrangements have been proposed in the past for providing access to the hot parts without disassembling the engine. For the most part, these arrangements have included inspection ports in the engine walls for permititng the insertion of inspection tools such as a Borescope, a small periscope-like viewing instrument. Although these inspection port arrangements have contributed greatly to easy and rapid inspection of the hot parts, they have not been entirely satisfactory in practice because of certain performance problems. More particularly, means must be provided for effectively sealing the ports during engine operation to prevent undesired leakage and accompanying losses in operating efficiency. Since in a gas turbine engine there are typically at least two concentric walls between the exterior of the engine and the hot gas stream, this means that the sealing means employed must be capable of sealing mating ports in the concentric walls. Preferably, this sealing of the mating ports should be done with a single device so that no closure elements can be inadvertently omitted without being easily noticed. This simultaneous sealing of mating ports with a single device has not, however, been easily accomplished in practice because of two major problems, these being the high pressure differentials existing across the ports during engine operation and relative movement between the walls and the ports therein due to temperature changes in the engine.

It is therefore an object of this invention to provide improved means for permitting inspection of high temperature engine parts without disassembling the engine.

Another object of this invention is to provide improved inspection port apparatus which does not adversely affect engine performance by permitting undesired leakage.

A further object of this invention is to provide a single device for simultaneously and effectively sealing multiple inspection ports in concentric walls of a gas turbine engine.

A still further object is to provide for gas turbine engines a single device for simultaneously sealing multiple inspection ports, the device being capable of providing effective sealing in the presence of substantial pressure differentials across the ports and relative movement between the ports due to thermal growth within the engine.

Yet another object of this invention is to provide the foregoing objects with relatively simple apparatus that is easy and inexpensive to manufacture and reliable in operation.

Briefly stated, in carrying out the invention in one form, a gas turbine engine includes an outer casing and a concentric inner casing having radially aligned ports therein for permitting inspection of internal engine components from the outside of the engine. The ports are simultaneously sealed by a composite seal assembly having relatively movable seal members for blocking the respective ports, the relatively movable seal members providing effective sealing in the presence of relative thermal growth between the inner and outer casings. Furthermore, the port in the inner casing and the associated seal member have mating seal surfaces disposed such that their sealing effectiveness is enhanced during engine operation by the normal static pressures existing in the engine. More particularly, in the turbine region of the engine, the port in the inner casing has an outwardly facing seal surface and the seal member has an inwardly facing seal surface such that the high pressure normally existing between the inner and outer casings, relative to the lower pressure in the motive fluid passageway inwardly of the inner casing, will force the seal surfaces into sealing engagement. In other words, the greater the pressure differential across the port, the greater the sealing force and sealing effectiveness.

By a further aspect of the invention, the relatively movable seal members are interconnected by means permitting relative movement through a predetermined range of positions, the range being sufficient to assure adequate sealing under all conditions of relative thermal growth between the inner and outer casings. In addition, the interconnecting means includes a spring for biasing the seal members apart such that the port in the inner casing is sealed at all times with the spring force augmenting the differential pressure force during engine operation. By still further aspects of the invention, the port in the inner casing is located between adjacent stator vanes such that the hot parts can be inspected without removing any engine parts other than the composite seal assembly, and the seal member completely fills the port to form with the inner casing a substantially continuous outer periphery for the motive fluid passageway.

While the novel features of this invention are set forth with particularity in the appended claims, the invention, both as to organization and content, will be better understood and appreciated, along with other objects and features thereof, from the following detailed description taken in conjunction with the drawing, in which:

FIG. 1 is a cross-sectional view of a gas turbine engine having the inspection apparatus of this invention;

FIG. 2 is an enlarged cross-sectional view of the inspection apparatus of FIG. 1; and FIG. 3 is a pictorial exploded view of a portion of the inspection apparatus, including the composite seal assembly.

Referring to the drawing, and particularly to FIG. 1, an axial flow gas turbine engine 10 is illustrated, the engine 10 including an axial flow compressor 11, an annular combustor 12, and a turbine 13 disposed in serial flow relation within a generally cylindrical outer casing 14. The combustor 12 includes an annular combustion liner 15 located in spaced relationship to the outer casing 14 and an inner wall 16, the actual combustion occurring within the space 17 enclosed by the liner 15. The annular spaces 18 and 19 between the combustion liner 15 and the casing 14 and the wall 16, respectively, are filled with high pressure air discharged by the compressor 11. This high pressure air, which is quite cool relative to the high temperature combustion gases within the combustion liner 15, is admitted in a controlled manner to the interior space 17 to support combustion and provide cooling therein. In addition, the compressed air is supplied to a casing region or plenum 20 for providing turbine cooling. The present invention also utilizes this pressurized air for providing effective sealing of an inspection port apparatus 21 during engine operation.

Still referring to FIG. 1 and the turbine 13, an annular nozzle diaphragm indicated generally by 25 is located at the downstream end of the combustion liner 15 for supplying the hot products of combustion to a row of turbine buckets 26 at the proper velocity and at the proper angle. From the turbine buckets 26, the hot combustion gases flow through a second stage turbine nozzle diaphragm 27 which redirects the gases to a second row of turbine buckets 28. The turbine buckets 26 are peripherally mounted on a turbine wheel 29 which, along with its associated shaft 30 and a second turbine wheel 31 having the buckets 28 mounted thereon, is rotatably mounted on the engine axis 32 by suitable bearing means. The turbine unit comprising the wheels 29 and 31 and the shaft 30 drives the compressor 11.

It will be noted that the entire flow of combustion products passes through the annular nozzle diaphragms 25 and 27 and over the rows of turbine buckets 26 and 28. The combustion products thus flow through an annular passageway 35 formed within the turbine 13, the outer boundary of the passageway 35 being formed by inner casing means coaxially disposed within the outer engine casing 14. More particularly, the inner casing means includes outer annular bands 36 and 37 of the nozzle diaphragms 25 and 27, respectively, and annular shroud rings 38 and 39 peripherally surrounding the rows of turbine buckets 26 and 28, respectively. The elements 36–39 comprising the inner casing means also cooperate with the outer engine casing 14 to form the casing region or plenum 20 from which high pressure air is supplied in a well-known manner to the nozzle diaphragms 25 and 27 for cooling these high temperature components.

As discussed previously, it is desirable to provide means for inspecting the high temperature turbine elements, particularly the turbine buckets 26 and 28, from the outside of the engine 10 without disassembling the casing 14 or any other part of the engine 10. To accomplish this, inspection ports must be provided in both the outer casing 14 and the inner casing means to permit access to the annular turbine passageway 35 and the turbine elements with a borescope, a small periscope-like viewing instrument, and other inspection tools. Heretofore, this approach has not been entirely satisfactory due to the difficulty of sealing the inspection ports during engine operation because of relative thermal growth between the outer casing and the inner casing means and the high pressure existing in the regions 20.

By the present invention, an inspection port apparatus 21 is provided which not only permits access to the hot parts without disassembling the engine, but also effectively seals the inspection ports during engine operation, thereby maintaining highly efficient operation. In fact, the static pressures normally existing in the engine during operation are utilized by the apparatus of this invention to enhance the sealing effectiveness.

The inspection apparatus of this invention will now be described with particular reference to FIGS. 2 and 3. As shown, an inspection port 45 is provided in the outer support band 37 of the second stage nozzle diaphragm 27, the inspection port 45 being located circumferentially between two adjacent stator vanes 46 such that turbine inspection can be performed without removing any of the internal turbine elements. Another inspection port 47 provided in the outer engine casing 14 in radial alignment with the port 45, the port 47 being of larger size than the port 45 in order to permit the removal through the outer port 47 of the sealing means for the port 45. Within limits determined by the spacing between the vanes 46, the port 45 is sized to permit the insertion of all necessary inspection tools into the annular passageway 35.

Still referring to the inspection ports, it will be noted that the port 45 actually comprised of a radial passage in a boss 50 which projects radially outward from the band 37 into the high pressure plenum 20. An outwardly facing seal surface 51 of frustoconical configuration is located at the outer end of the passage 45. Similarly, the port 47 is actually a threaded passage in a casing boss 52 having a flat seal surface 53 on the outer face thereof.

A composite seal assembly 60 is utilized to seal both of the inspection ports 45 and 47 simultaneously during engine operation, the seal assembly 60 including relatively movable seal members 61 and 62. The seal member 61 is a plug having a frustoconical seal surface 63 thereon for mating with the seal surface 51 to prevent leakage through the port 45 and a generally cylindrical portion 64 for completely filling the port 45 such that there will not be a discontinuity in the band 37 during engine operation. The seal member 62 is a threaded nut which can be screwed into the port 47, sealing of the port 47 being provided by compression of a gasket 66 between the seal surface 53 on the casing boss 52 and a mating seal surface 67 on the nut 62. In addition, the nut 62 has a cavity 68 formed therein which, when the composite seal assembly 60 is positioned in the engine as shown by FIG. 2, opens inwardly into communication with the high pressure plenum 20. The plug 61 further includes a stem 70 formed integrally therewith and having an enlargement 71 received in the cavity 68 and maintained therein by a snap ring 72. The stem 70 has a bore 73 therein in which a spring 74 is received and maintained in compression between a shoulder 75 in the bore 73 and the outer surface 76 of the cavity 68. The spring 74 thus biases the sealing members 61 and 62 apart, the maximum amount of separation being, of course, limited by engagement between the enlargement 71 and the snap ring 72. By overcoming the force of the spring 74, the seal members 61 and 62 can be moved closer together, the minimum amount of separation being limited by engagement between the enlargement 71 and the surface 76. In other words, the seal members 61 and 62 may be moved through a range of relative positions. As will be described presently, this range is selected such that sealing of the inner port 45 as well as the outer port 47 is provided at all times.

When it is desired to seal the inspection ports 45 and 47, the composite seal assembly 60 is inserted radially through the port 47 until the generally cylindrical portion 64 enters the port 45 and the seal surface 63 engages the mating seal surface 51. At this point, the gasket 66 will not be compressed. Continued turning of the nut 62 will, however, compress the spring 74 and thus reduce the spacing between the seal members until the gasket 66 is compressed between the seal surfaces 53 and 67 to adequately seal the port 47. The spring force will, of course, continue to maintain the seal surfaces 63 and 51 in engagement. During engine operation, the high pressure existing in the plenum 20 and acting on the entire outer surface of the plug 61 forces the surfaces 63 and 51 into tight and effective sealing relationship. This pressure force overcomes the much smaller outwardly directed force produced by the lower static pressure within the passage 35 which acts on the smaller surface 80 of the plug 61. In this respect, it will be noted that the force of the spring 74 merely augments the much higher differential pressure force existing during engine operation. To assure that the pressure is permitted to provide this enhanced sealing at all times, the cavity 68 in the nut 62 is sized to permit a range of relative movement between the sealing members 61 and 62 that is sufficient to accommodate all degrees of relative thermal expansion and contraction between the outer casing 14 and the inner casing means during engine operation.

To inspect the turbine elements, it is only necessary to unscrew the sealing member 62 and remove the entire seal assembly 60 through the outer port 47, as illustrated by FIG. 3. Inspection tools can then be inserted through the aligned ports into the motive fluid passageway 35. With the inspection ports located as illustrated, it is possible to inspect the complete rows of turbine buckets 26 and 28 by turning the engine rotor assembly to move each bucket past the inspection station. After the inspection is completed, the composite seal assembly 60 may be reinserted and the engine 10 will then be in condition for operation. It will be noted that the composite seal assembly 60 is a single device having relatively movable parts; it is therefore impossible to inadvertently seal only the port 47 in the engine casing 14.

It will be obvious to those skilled in the art that the inspection port apparatus of this invention can be used in engine locations other than between adjacent stator vanes.

From the foregoing, it will be appreciated that the inspection apparatus of this invention permits inspection of high temperature engine ports without requiring engine disassembly or compromising engine performance, including efficiency, during operation. The relatively simple and reliable composite seal assembly provides effective sealing under all operating conditions even though the ports it seals may move relative to each other, the static pressures existing in the engine during operation being utilized to enhance the sealing effectiveness.

It will be understood that the invention is not limited to the specific details of the construction and arrangement of the particular embodiment illustrated and described herein. It is therefore intended to cover in the appended claims all such changes and modifications which may occur to those skilled in the art without departing from the true spirit and scope of the invention.

What is claimed as new and is desired to secure by Letters Patent of the United States is:

1. A gas turbine engine assembly comprising:
 a generally cylindrical outer casing,
 inner casing means coaxially disposed within said outer casing in spaced relation thereto,
 said inner casing means defining the outer periphery of a passageway for the flow of high temperature motive fluid through the engine assembly,
 first and second radially aligned inspection ports in said outer casing and said inner casing means, respectively,
 and a composite seal assembly having first and second relatively movable seal members for blocking said first and second inspection ports, respectively,
 said second inspection port and said second seal member having mating seal surfaces for preventing leakage through said second inspection port,
 said second seal member and said mating seal surfaces being disposed such that sealing effectiveness is enhanced during engine operation by the normal static pressures existing in said engine assembly.

2. A gas turbine engine assembly as defined by claim 1 in which said first inspection port is larger than said second inspection port such that said composite seal assembly may be removed radially through said first inspection port to permit inspection within said fluid flow passageway.

3. A gas turbine engine assembly as defined by claim 2 including at least one row of high temperature blading comprised of a plurality of circumferentially spaced-apart stator vanes supported by and extending radially inward from said inner casing means across said fluid flow passageway, said second inspection port being circumferentially located between an adjacent pair of said stator vanes to permit inspection within said fluid flow passageway by removal of only said composite seal assembly.

4. In a gas turbine engine assembly including a compressor, a combustor, and a turbine arranged in serial flow relation; a generally cylindrical outer casing surrounding said turbine; inner casing means coaxially disposed within said outer casing in spaced relation thereto; means interconnecting said compressor and the annular space between said outer casing and said inner casing means for supplying high pressure air to said annular space; said inner casing means defining the outer periphery of the motive fluid passageway through said turbine; and said turbine including at least two rows of axially spaced, circumferential rows of high temperature blading disposed in said motive fluid passageway; improved inspection port apparatus comprising:
 first and second radially aligned inspection ports in said outer casing and said inner casing means, respectively,
 said first inspection port being larger than said second inspection port and said first and second inspection ports being located such that the static pressure inwardly of said second inspection port during engine operation is substantially less than the pressure in the annular space between said first and second inspection ports,
 and a composite removable seal assembly having first and second relatively movable seal members for blocking said first and second inspection ports, respectively,
 said first seal member and said first inspection port having mating means for locking said composite seal assembly in position and for preventing leakage through said first inspection port,
 said second inspection port having a radially outward facing seal surface and said second seal member having a radially inward facing seal surface for mating with the seal surface of said second inspection port,
 whereby the pressure differential across said second seal member and said second inspection port maintains said seal surfaces in contact during engine operation to prevent leakage through said second inspection port.

5. Inspection port apparatus as defined by claim 4 in which said relatively movable seal members are interconnected by means permitting relative radial movement of said second seal members through a predetermined range of positions, said range being such that the seal surfaces of said second seal member and said second inspection port engage and thereby prevent leakage under all conditions of relative thermal growth between said outer casing and said inner casing means.

6. Inspection port apparatus as defined by claim 5 in which the means interconnecting said first and second seal members includes spring means biasing said seal members apart to maintain the seal surface of said second seal member in contact with the seal surface of said second inspection port at all times, the force of said spring means augmenting the differential pressure force across said second inspection port during engine operation.

7. Inspection port apparatus as defined by claim 6 in which the means interconnecting said first and second seal members further includes a stem secured to said second seal member and extending radially outward therefrom, said stem having an enlargement at the radially outer end thereof, said first seal member having an inwardly opening cavity formed therein, said enlargement being disposed within said cavity, and stop means permitting limited radial movement of said enlargement within said cavity, said stop means thereby defining the range of positions through which said second seal member is permitted to move relative to said first seal member.

8. Inspection port apparatus as defined by claim 7 in which said second seal member includes a portion extending radially inward of the seal surfaces of said second seal member and said second inspection port to provide with the inner casing means of the engine assembly a substantially continuous outer periphery for the motive fluid passageway through the turbine.

9. Inspection port apparatus as defined by claim 8 in which the seal surfaces of said second seal member and said second inspection port are of frustoconical configuration.

10. Inspection port apparatus as defined by claim 9 in which at least one row of the high temperature turbine blading is comprised of a plurality of circumferentially spaced-apart stator vanes supported by and extending radially inward from said inner casing means across said fluid flow passageway, said second inspection port being circumferentially located between an adjacent pair of said turbine stator vanes to permit inspection of the high temperature blading of said turbine by removal of only said composite seal assembly.

References Cited

UNITED STATES PATENTS

| | | | |
|---|---|---|---|
| 1,155,996 | 10/1925 | Leverich | 199—27 |
| 2,156,133 | 4/1939 | Troller | 170—172 |
| 2,965,286 | 12/1960 | Ledwith et al. | 230—133 |
| 3,007,312 | 11/1961 | Shutts | 60—39.82 |

JULIUS E. WEST, *Primary Examiner.*